(Model.)

W. CROWELL.
BOX, BARREL, OR CRATE.

No. 250,890. Patented Dec. 13, 1881.

Witnesses:
William W. Mortimer
W. H. Kerr

Inventor:
Wm. Crowell
per F. A. Lehmann,
Atty.

UNITED STATES PATENT OFFICE.

WILLIAM CROWELL, OF DENNIS, MASSACHUSETTS.

BOX, BARREL, OR CRATE.

SPECIFICATION forming part of Letters Patent No. 250,890, dated December 13, 1881.

Application filed November 3, 1881. (Model.)

*To all whom it may concern:*

Be it known that I, WM. CROWELL, of Dennis, in the county of Barnstable and State of Massachusetts, have invented certain new and useful Improvements in Boxes, Barrels, or Crates; and I do hereby declare the following to be a full, clear, and exact description of the invention, such as will enable others skilled in the art to which it pertains to make and use it, reference being had to the accompanying drawings, which form part of this specification.

My invention relates to an improvement in boxes, barrels, and crates, such as are used in the transportation of fruit and other perishable goods; and it consists in forming grooves in the inner sides of the boxes or barrels, and in the sides of the partitions placed therein, the grooves in the partitions being made to connect with the grooves in the sides of box or barrel, so as to allow the fruit a free ventilation, as will be more fully described hereinafter.

The object of my invention is to groove the inner sides of boxes and barrels used in the transportation of fruit, in contradistinction to a grooved post which is passed through the center of the barrel, whereby a sufficient ventilation is allowed the fruit to prevent it from decaying.

Figure 1:
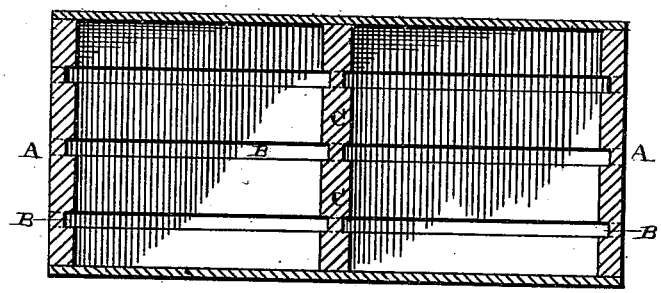
Figure 2:
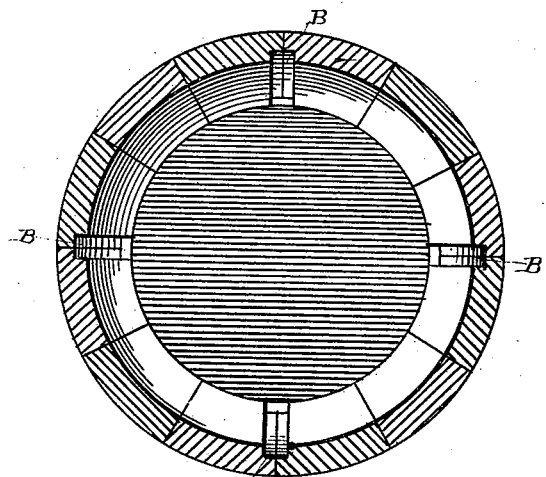
Figure 3:
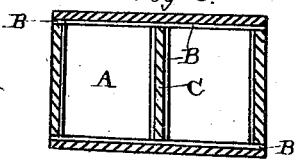

Figure 1 represents a vertical longitudinal section made through a box or crate. Fig. 2 is a horizontal cross-section taken through a barrel. Fig. 3 is a horizontal section taken through the grooves made in the box and its partition.

A represents an ordinary box or crate, such as is used in the transportation of fruit, and which has a series of grooves, B, made in the inner surfaces of the sides and ends. These grooves extend entirely through the ends of the boxes and barrels, as shown by dotted lines in Fig. 1 and by solid lines in Fig. 2. There may be any desired number of these grooves, and they may be made of any width or depth, the object being to make the groove sufficiently large to allow a free ventilation of the fruit or other goods of a perishable nature. Where a partition, C, is used in the center of the box, grooves will be made in the sides of this partition in the same manner, and these grooves will connect with the grooves which are made in the sides of the box, so that the ventilation will be the same upon all sides. Where a barrel is used instead of a box or crate, the grooves will run lengthwise with the staves, and will open through the end of the barrel in the same manner as in the box or crate. All of the gas which is thrown off from the fruit will pass readily into these grooves and then make its escape, thus preventing the fruit from heating and becoming decayed.

I am well aware that a grooved post has been passed through the center of barrels and a grooved partition through the center of a box for the purpose of ventilation, for this is shown in a former reissued patent granted to myself, and this I therefore disclaim. This grooved post extending horizontally through the barrel may be used in connection with the grooves in the side of the barrel, if so preferred.

Having thus described my invention, I claim—

1. A fruit box or barrel having the grooves B made in its inner sides and extending from one end of the box or barrel to the other and through the ends, so as to communicate directly with the air, substantially as shown.

2. A box, A, provided with the partition C, and having the grooves B made in its inner surfaces and in the sides of the partition, the grooves in the side of the box being made to communicate with the air and connecting with those in the side of the partition, substantially as set forth.

In testimony whereof I affix my signature in presence of two witnesses.

WILLIAM CROWELL.

Witnesses:
WM. B. MASON,
MARCUS F. KETCHAM.